Figure 1:
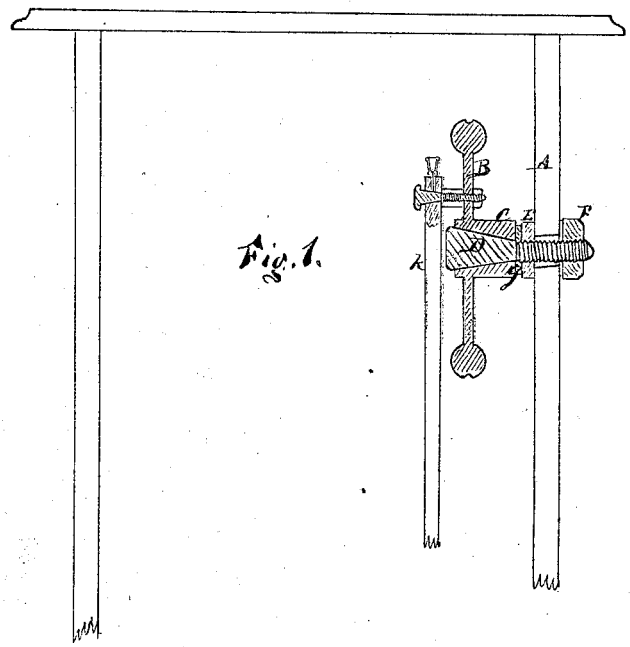

No. 118,469. Patented Aug. 29, 1871.

Robert H. McCann.
Improved Stud for Suspending
Sewing Machine Driving Wheels.

Witnesses.
Allen Miller
Thos. H. Lynn

Inventor.
Robt. H. McCann

UNITED STATES PATENT OFFICE.

ROBERT H. McCANN, OF ZANESVILLE, OHIO.

IMPROVEMENT IN STUDS FOR SUSPENDING DRIVING-WHEELS FOR SEWING-MACHINES.

Specification forming part of Letters Patent No. 118,469, dated August 29, 1871; antedated August 24, 1871.

*To all whom it may concern:*

Be it known that I, ROBERT H. McCANN, of Zanesville, in the county of Muskingum and State of Ohio, have invented a new and Improved Stud for Suspending Sewing-Machine Driving-Wheels, of which the following is a specification:

The nature of this invention relates to the construction of a stud upon which the driving-wheel of a sewing-machine turns, in such a manner that whenever the stud or pin becomes worn the same may be taken up, and thus prevent the wheel from running unsteadily or rattling.

In the drawing, Figure 1 is a vertical section of the stud, showing its connection with the table and wheel.

A represents the leg of a sewing-machine table. B is the section of a wheel, the hub c of which has a tapering or conical-shaped hole. D is a stud or pin, upon which the wheel B turns, and is made tapering or in the form of a cone; the extended portion has a screw-thread cut upon it, by which it is secured to the table-leg. E is a nut on the screw, and bearing against the inside of the leg; and F is a nut outside of the leg. Between these two nuts the stud is firmly secured to the table-leg. Between the nut E and the hub c of the wheel is a washer, g.

By this mode of constructing and attaching the stud or pin, should the pin become worn so as to render the wheel to fit loosely on the pin and to turn irregularly and rattle, the pin may be drawn tighter in the hub by turning the nut E up toward the hub c, and then tightening up the nut F, and thus overcoming the aforesaid difficulty. The pin connecting the pitman k with the wheel B is constructed in like manner to the stud D, and may also be regulated to take up the loose or slack by similar means. This enables an operator to always keep the above-described running-parts of a sewing-machine in good running order.

Having thus described my invention, I claim—

The combination of the stud D, nuts E F, and washer g with the wheel B and leg A of a sewing-machine, substantially as and for the purpose set forth.

ROBT. H. McCANN.

Witnesses:
ALLEN MILLER,
THOS. M. LYNN.